United States Patent Office 3,721,651
Patented Mar. 20, 1973

3,721,651
CATIONIC RESIN PREPARED BY TWO STAGE CONDENSATION OF MELAMINE, FORMALDEHYDE AND ALIPHATIC HYDROXYLATED MONOAMINE
Raymond W. Yates, West Bromwich, England, assignor to British Industrial Plastics Limited, Manchester, England
No Drawing. Filed May 22, 1970, Ser. No. 39,885
Claims priority, application Great Britain, May 22, 1969, 26,265/69
Int. Cl. C08g 9/30
U.S. Cl. 260—29.4 R    19 Claims

ABSTRACT OF THE DISCLOSURE

Production of cationic resin syrup comprising modified melamine-formaldehyde resin by two-stage condensation of melamine, formaldehyde and an aliphatic hydroxylated monoamine, the ratio of formaldehyde to melamine being between 2:1 and 6:1, the solids content of the reactants at least 60 wt. percent, the first stage of condensation being carried out at pH greater than 8.5 and the second stage carried out at pH in range 7.0–8.5. Where storage is required, the pH is adjusted after condensation to 6.5–7.5. The product is of particular value in increasing wet-strength of paper.

---

This invention relates to the preparation of condensation products, being cationic water-soluble modified melamine-formaldehyde resins which are especially useful for imparting wet strength to paper.

Melamine-formaldehyde resins are well known in the art and resins comprising solely melamine and formaldehyde, as well as those containing melamine, formaldehyde and a modifying component, find many uses. The use of melamine resins for imparting wet strength to paper is well known. For example, a melamine-formaldehyde resin may be dissolved in a solution of hydrochloric acid and aged for a certain period of time. The resin becomes more highly condensed during this period and forms a polymer of colloidal size (Dickson, Christopher & Salley, Paper Trade Journal, Nov. 11, 1948, "Fundamental Physical Chemical Characteristics of Melamine Resin Acid Colloid"). The acid colloid so formed is very efficient as a beater additive for paper. However, it is only stable at high dilution (6% solids) and therefore must be prepared by the paper-maker just prior to use. This is inconvenient from the papermaker's point of view since it necessitates the installation of equipment for its preparation. A further disadvantage of melamine acid colloids is that their efficiency is adversely affected by the presence of comparatively low concentrations of polyvalent ions. Sulphate ions are often encountered under paper-making conditions. It has been observed by other workers (Maxwell & House, "High Efficiency Wet Strength Paper," Tappi, 44, No. 5, May 1961) that melamine acid colloids become less susceptible to sulphates when the ratio of combined formaldehyde per mole of melamine is in excess of 3 moles.

Other water-soluble melamine resins are known, for example, highly methylated polymethylol melamines. These products have only a low degree of polymerisation and are slow to cure. Further, they are not generally effective as beater additives, although they may be used in textile applications.

It is also known, e.g. from U.K. specification 630,618, to prepare amino-formaldehyde resins containing small quantities, i.e., not greater than 0.04 mole per mole melamine, of alkanolamines in order to impart buffering action to changes of pH, and further, containing also polyfunctional amines to react with excess formaldehyde.

In U.K. specification 832,203 a process is described for preparing a water-soluble modified melamine-formaldehyde resin, which comprises reacting melamine, formaldehyde and an aliphatic polyamine (with the ratio of carbon atoms to nitrogen atoms being not greater than 4:1) in certain proportions. This resin is utilised for imparting wet strength to paper and as anchoring agent for top coat material on solid base material.

In our U.K. specification 1,012,319 we have described the production of a modified melamine-formaldehyde resin by condensing melamine, formaldehyde and an aliphatic hydroxylated monoamine of the general formula:

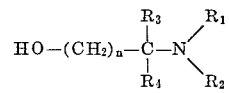

wherein $n$ is an integer, and $R_1$, $R_2$, $R_3$, $R_4$ (which may be the same or different) are hydrogen, alkyl or hydroxyalkyl, the molar ratio of formaldehyde to melamine being greater than 6:1 and the molar ratio of the hydroxylated monoamine to melamine being at least 0.1:1. Because of the inevitable high free formaldehyde content of such condensates, however, their use in the paper industry has been negligible in view of the problems of providing adequate fume extraction equipment and the wastage of the excess formaldehyde. Furthermore, the molecular weight level of such condensates has been restricted to such a degree as to render formulations poor in efficiency as wet strengthening agents. They have, however, found valuable use in the anchorage of moisture-proof top-coats to extruded cellulose film.

In U.K. specification 1,107,057 there is described a process for the production of polyethermelamines by reacting one or more mono-, di- or poly-hemiformals of polyhydroxy compounds with melamine in the presence of an acid or basic catalyst. It is stated that the hemiformals may be produced by reacting polyhydroxy compounds with formaldehyde, and suitable polyhydroxy compounds include diethanolamine and triethanolamine. They lead to hard vitreous articles.

It is the object of the present invention to provide a process for the production of new cationic, water-soluble melamine-formaldehyde resins which may be used to impart wet-strength to paper.

According to the invention a modified melamine-formaldehyde resin is produced by the condensation, in two stages, of melamine, formaldehyde and at least one aliphatic hydroxylated monoamine, wherein the molar ratio of formaldehyde to melamine is 2:1 to 6:1, the first stage of the condensation is carried out at a pH greater than 8.5, the second stage of the condensation is carried out at a pH of 7.0 to 8.5 and, for at least the major part of the condensation, the solids content of the reactants is at least 60% by weight.

The aliphatic hydroxylated monoamine may be mono- or poly-functional with respect to the hydroxyl group. It is suitably used in an amount of 0.1–2.0 moles, preferably 0.5–1.5 moles, per mole of melamine. Especially suitable are those compounds of the general formula

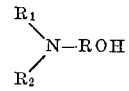

wherein R is alkylene, (preferably $(CH_2)_2$ or $(CH_2)_3$; $R_1$ is hydrogen, an alkyl group, (preferably $CH_3$ or $C_2H_5$), or a hydroxyalkyl group, (preferably $(CH_2)_2OH$ or $(CH_2)_3OH$); and $R_2$ is an alkyl group, (preferably $CH_3$ or $C_2H_5$), or a hydroxyalkyl group, (preferably $(CH_2)_2OH$ or $(CH_2)_3OH$); i.e. secondary or tertiary mono- or poly-hydroxylated monoamines. Also, effective are compounds where $R_1$ and $R_2$ together form an alkylene group.

Broadly speaking, the three reactants may be reacted together in any order. Thus, all three may be charged into the reaction vessel at the same time. Alternatively, the melamine and formaldehyde may firstly be partially condensed, to methylolmelamines, after which the hydroxylated monoamine may be added. Again, and this is the preferred mode of operation, the formaldehyde and monoamine may be reacted together first, following which the melamine is added to the reaction.

The high solids condition required according to the invention can be achieved by
(i) the use of concentrated grades of formaldehyde (e.g. 82% formaldehyde) to which water may be added,
(ii) the concentration of reaction mixtures resulting from the use of more dilute (e.g. 36%) formaldehyde, or
(iii) mixtures of 36% Formalin and more concentrated grades of formaldehyde.

The reaction solids are calculated from the weight percentage of melamine, formaldehyde and hydroxylated monoamide present and should be greater than 60%, preferably 70-80%. It should be noted that the condensation reaction may be started with a solids content of less than 60%, e.g. when initially the formaldehyde and amine are reacted together, but in order to obtain sufficient hemiacetal formation the condensation must be continued at a solids content greater than 60% (e.g. by vacuum evaporation) for some time before adjustment of the pH.

As stated, the process of the invention is two-stage process. In the first stage, wherein for example the hydroxylated monoamine may be reacted with formaldehyde or a melamine-formaldehyde precondensate, the preferred pH and temperature ranges 8.5-11.0 and 80° C.-reflux, respectively. A processing time of 1-2 hours from the time everything is in solution is suitable under these conditions, the solids content being preferably 70-80%.

At the completion of the above stage, melamine is added, if not already included, and the pH of the reactant mixture is adjusted to 7.0-8.5, preferably 7.5-8.0. Processing is then continued at a temperature of 60° C.-reflux, preferably 85-95° C., until the molecular weight level is such that the resin syrup at 30% solids has a viscosity of 100-400 centistokes, preferably 200-300 centistokes. The processing solids for this stage must be greater than 60%, at least until the above viscosity and is preferably 70-80%. Where an appreciable storage life is desired, the resin syrup is diluted with water at the termination of condensation to yield a product of commercially acceptatble viscosity and the pH adjusted to 6.5-7.5. pH adjustment can be carried out prior to dilution, and if desired condensation may continue after dilution. The adjustment of pH may be effected by means of concentrated hydrochloric acid, which we have found preferable, or by means, for example, of orthophosphoric acid, sulphuric acid, oxalic acid, formic acid or p-toluene sulphonic acid.

The products of the invention are infinitely soluble in water and are of sufficiently low free formaldehyde (less than 4% based on resin syrup at 50% solids) to be acceptable to the paper industry. Moreover, the wet strength efficiency of these resins is at least equivalent to that of the well established melamine acid colloids produced by the dissolution of melamine resin in dilute hydrochloric acid. The products of this invention avoid the extra complication of the colloid manufacturing process.

The following examples are given for the purpose of illustrating the invention. In the examples, "P.R.S." (Paint Research Station) refers to viscosity measurements made in accordance with the pamphlet on the P.R.S. Bubble Viscometer published in February, 1954 by The Research Association of British Paint, Colour and Varnish Manufacturers of Waldegrave Road, Teddington, England.

EXAMPLE 1

103 gms. of 82% formaldehyde, 531 gms. of 90% triethanolamine and 160 gms. of water were charged to a reactor flask (pH of slurry 10.4) and heated to 85° C. The formaldehyde dissolved in approximately 15 mins. and the reaction was continued for a further 1¾ hours. After cooling to about 50° C., 403 gms. of melamine were added and the pH adjusted to 7.7 with 48 mls. of commercial conc. HCl (36.0% w./w.). The temperature was increased to 90° C., the melamine dissolving at about 80° C. to give a homogeneous reactant mixture. At a viscosity of 15A-16 (P.R.S. tubes at 25° C.) 400 gms. of water were added and condensation continued to 18A-19 (P.R.S. tubes at 25° C.). 1050 gms. of water were added, plus 80 mls. of conc. HCl. The resulting product was a water-white, cationic syrup, completely miscible with water. The pH (G.E.)[1], solids content and viscosity were 7.0, 35% and 7A (P.R.S. tube at 25° C.) respectively. The free formaldehyde content was 2.1% based on the syrup.

EXAMPLE 2

585 gms. of 82% formaldehyde, 664 gms. 90% triethanolamine and 350 gms. water were charged to a reactor flask (pH of slurry 10.0), and heated to 85° C. This temperature was maintained for 2 hours. After cooling to about 50° C., 504 gms. of melamine and 90 mls. of conc. HCl were charged to the flask (pH 7.9), and the contents of the flask heated to 88° C. The reaction was continued until 10 mls. of resin syrup tolerated 1 ml. of water at 20° C. 400 gms. of water plus 140 mls. conc. HCl were then added. This yielded a cationic syrup, completely miscible in water. The solids content was 48% and viscosity 16-16A (P.R.S. tube at 25° C.).

EXAMPLE 3

219 gms. of 82% formaldehyde, 191 gms. of tri-n-propanolamine and 100 gms. water were charged to a reactor flask (pH of slurry 10.6), and heated to 85° C. The reaction was continued for 2 hours. After cooling to about 50° C., 126 gms. of melamine were added and the pH of the reactant mixture adjusted to 7.95 with 10 mls. conc. HCl. The temperature was increased to 95° C. to give a clear solution and maintained at this level until a viscosity of 17A (P.R.S. tube at 25° C.) was reached. 100 gms. of water were added; then, after cooling to about 30° C., 12 mls. conc. HCl were charged to adjust the pH to 7.2. The resulting resin was cationic, completely miscible in water and had a solids content of 48%.

EXAMPLE 4

1344 gms. of 36% formalin and 442 gms. of 90% triethanolamine were charged to a reactor flask (pH of slurry 9.6), equipped with vacuum distillation apparatus. Using a vacuum of 25" of mercury and a temperature of 60° C., 652 gms. of water were removed in about 30 mins. The temperature was then increased to 85° C. and the reaction continued at atmospheric pressure for 1 hour. After cooling to 50° C., 336 gms. of melamine were added and the pH adjusted to 7.1 with an addition of 100 mls. of conc. HCl. The temperature was raised to 85° C. to yield a clear solution and the reaction continued to a viscosity of 19-19A (P.R.S. tube at 25° C.). 300 gms. of water were then added and the resin cooled to about 30° C. The pH was adjusted to 7.15 with an addition of 60 mls. of conc. HCl. The product was cationic and completely water-miscible.

EXAMPLE 5

504 gms. of melamine, 878 gms. of 82% formaldehyde, 664 gms. of 90% trietanolamine and 200 gms. of water were charged to a reactor (pH>10) and heated to 90° C. The reaction was continued for 2 hours (slight precipi- ---
[1] Glass electrode.

tation occurred after 30 mins.). The reactant mixture was cooled to 60° C. and 100 mls. of conc. HCl were added to give pH 7.6 300 mls. of water were added and the temperature increased to 89° C. (slight precipitation then dissolved). The reaction was continued at this temperature until a viscosity of 19A (P.R.S. tube at 25° C.) was achieved, 300 mls. of water weer added and the syrup re-condensed to 16A (P.R.S. tube at 25° C.). 250 mls. of water were added and the resin syrup cooled to room temperature. 80 mls. of conc. HCl were added to adjust the pH to 7.15. The resulting product was cationic and completely water-miscible. Its solids content was 43.5%.

EXAMPLE 6

585 gms. of 82% formaldehyde, 624 gms. of diethylaminoethanol and 67 gms. of water were charged to a reactor flask (pH of slurry 11.0). The temperature was increased to 90° C. and maintained for 2 hours. After cooling to 45° C., 336 gms. of melamine were charged and the pH adjusted to 7.8 by an addition of 400 mls. of conc. HCl. The temperature was increased to 98° C. and the reaction continued until 10 mls. of the syrup tolerated 10 mls. of water at 20° C. 200 gms. of water were added and the resin cooled. 30 mls. of conc. HCl were then added to give a final pH of 7.4. The product was cationic and completely water-miscible.

EXAMPLE 7

878 gms. of 82% formaldehyde, 210 gms. of diethanolamine and 550 gms. of water were charged to a reactor flask (pH of slurry 8.9). The temperature was increased to 85° C. and maintained for 2 hours. After cooling to about 60° C. 504 gms. of melamine were added, followed by 40 mls. of conc. HCl. The pH of the reactant mixture was 7.85. The temperature was increased to 89° C. and the reaction continued to a viscosity of 18 (P.R.S. tube at 25° C.). 500 gms. of water were added and the resin cooled to room temperature and 15 mls. of conc. HCl added to adjust to pH 6.9. The product had a viscosity of 12A at 45% solids and was cationic and completely miscible in water.

EXAMPLE 8

The material produced in Example 1 was evaluated for wet-strength in comparison with the standard M.F. Regular Colloid. Hand-sheets weer made on the British Paper & Board Makers Association apparatus using Soundview pulp at a freeness of 30° Schopper Reigler. 2.0 parts by weight of solid resin per 100 parts of dry pulp were used and the pH of the pulp was adjusted to 6.5 with alum, as was the pH of the backwater. The sheets were then subjected to different cure schedules which indicated that the resin of our invention had practically the same wet strength performance as the M.F. Regular Colloid when cured for periods of 10 to 40 minutes at 85° C. At full cure (10 minutes at 127° C.) our resin showed a wet tensile strength (measured in lbs. per 15 mm.) of 7.5 compared with 6.15 for the M.F. Regular Colloid. Comparable dry tensile strengths were 15.3 and 13.9 respectively.

What is claimed is:

1. A process for the production of a cationic water soluble modified melamine-formaldehyde resin, comprising a two-stage process wherein in the first stage condensation is effected in an aqueous medium at a pH greater than 8.5 of reactants selected from the group consisting of (a) formaldehyde, melamine and at least one aliphatic hydroxylated monoamine of the formula

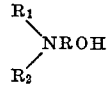

where R is an alkylene radical, $R_1$ is a radical selected from the group consisting of hydrogen, alkyl groups and hydroxy alkyl groups and $R_2$ is a radical selected from the group consisting of alkyl groups and hydroxyl alkyl groups, and (b) formaldehyde and at least one monoamine of (a); and a second stage reaction carried out at a pH within the range from 7.0 to 8.5 effected by acid addition to the product of the first stage, and in which process the molar ratio of formaldehyde to melamine is within the range from 2:1 to 6:1, the aliphatic hydroxylated monoamine is used in an amount of 0.1 to 2.0 moles per mole of melamine and at least a major part of both stages is operated at a solids content of at least 60% by weight.

2. The method of claim 1 wherein the first stage reaction is conducted at a pH of 8.5–11; the second stage reaction conducted at a pH of 7.5–8.0 and the pH of the resin formed is adjusted to 6.5–7.5 by addition of acid and water dilution.

3. The process of claim 1 for the production of a modified melamine-formaldheyde resin, comprising a first stage wherein formaldehyde is condensed with at least one aliphatic hydroxylated monoamine in an aqueous medium at a pH greater than 8.5, and a second stage wherein the product from the first stage is condensed at a pH within the range from 7.0 to 8.5 with melamine, and in which process the molar ratio of formaldehyde to melamine is within the range from 2:1 to 6:1, the aliphatic hydroxylated monoamine is used in an amount of 0.1 to 2.0 moles per mole of melamine and at least a major part of both stages is operated at a solids content of at least 60% by weight.

4. A process according to claim 1 wherein the first stage of the condensation reaction formaldehyde and an aliphatic hydroxylated monoamine selected from the class consisting of triethanolamine, tri-n-propanolamine, diethanolamine and diethylamino-ethanolamine until sufficient hemiacetal is formed so that the solids content is between about 60% and 80% and in the second condensation step melamine is added and the pH is adjusted to 7.5–8.0 and the solids content in this stage of the reaction is also between about 60% and 80%.

5. The method of claim 1 wherein the monoamine is triethanolamine.

6. The method of claim 1 wherein the monoamine is tri-n-propanolamine.

7. The method of claim 1 wherein the monoamine is diethanolamine.

8. The method of claim 1 wherein the monoamine is diethylaminoeethanolamine.

9. The method of claim 2 wherein the acid is selected from the group consisting of hydrochloric acid, orthophosphoric acid, sulphuric acid, oxalic acid, formic acid and p-toluene sulphonic acid.

10. The method of claim 9 wherein the acid is concentrated hydrochloric acid.

11. A process according to claim 1 where R is $(CH_2)_2$ or $(CH_2)_3$, $R_1$ is hydrogen, methyl or ethyl, hydroxyethyl or hydroxypropyl and $R_2$ is methyl, ethyl, hydroxyethyl or hydroxypropyl.

12. A process according to claim 11 wherein the first stage is carried out for 1–2 hours after the reactants are in solution and the second stage is continued until the resin syrup formed has a viscosity of 100–400 centistokes when measured at 30% solids.

13. A process according to claim 1, wherein the reaction solids, when all three components have been added, calculated from the weight percentage of melamine, formaldehyde and hydroxylated monoamine present, are in the range 70% to 80%.

14. A process according to claim 1, wherein the first stage comprises reacting the monoamine with formaldehyde or a melamine-formaldehyde pre-condensate at a pH in the range 8.5–11.0 and at a reflux temperature of at least 80° C.

15. A process according to claim 14, wherein the pH of the reaction mixture is adjusted after completion of the reaction of the monoamine to 7.0–8.5, melamine being added if not already included, and the second stage continued at a temperature of at least 60° C., until the molecular weight level is such that the resin syrup at 30% solids has a viscosity of 100–400 centistokes.

16. A process according to claim 14, wherein the pH of the reaction mixture is adjusted after completion of the reaction of the monoamine to 7.5–8.0, melamine being added if not already included, and the second stage continued at a temperature of 85°–95° C. until the molecular weight level is such that a resin syrup at 30% solids has a viscosity of 200–300 centistokes.

17. A process according to claim 1, wherein the resin syrup is diluted with water at the termination of condensation to yield a product of desired viscosity and the pH adjusted to 6.5–7.5.

18. A process according to claim 16, wherein the pH adjustment is effected by means of concentrated hydrochloric acid.

19. A process according to claim 16, wherein the pH adjustment is effected by means of orthophosphoric acid, sulphuric acid, oxalic acid, formic acid or p-toluene sulphonic acid.

References Cited

UNITED STATES PATENTS

| | | | |
|---|---|---|---|
| 2,339,769 | 1/1944 | D'Alelio | 260—70 |
| 2,471,188 | 5/1949 | Auten | 260—70 |
| 2,485,079 | 10/1949 | Wohnsiedler et al. | 260—29.4 |
| 2,561,973 | 7/1951 | Cohen | 260—553 |
| 2,626,251 | 1/1953 | James et al. | 260—70 |
| 3,478,096 | 11/1969 | Cyba | 260—563 |
| 2,197,357 | 4/1940 | Widmer et al. | 260—67.6 |
| 2,521,664 | 9/1950 | Dudley | 260—67.6 X |
| 2,750,355 | 6/1956 | Ledden | 260—67.6 |

FOREIGN PATENTS

| | | |
|---|---|---|
| 880,189 | 3/1943 | France. |
| 1,012,319 | 12/1965 | Great Britain. |

OTHER REFERENCES

Vale: Aminoplastics (1950), pp. 68, 71 and 72.

HOWARD E. SCHAIN, Primary Examiner

U.S. C. X.R.

162—167; 260—67.6 R